US012273479B1

(12) United States Patent
Xie

(10) Patent No.: US 12,273,479 B1
(45) Date of Patent: Apr. 8, 2025

(54) TELESCOPE CELL PHONE HOLDER

(71) Applicant: Zhongshan Fannai Technology Co., Ltd., Guangdong (CN)

(72) Inventor: Shanming Xie, Guangdong (CN)

( * ) Notice: Subject to any disclaimer, the term of this patent is extended or adjusted under 35 U.S.C. 154(b) by 0 days.

(21) Appl. No.: 18/951,175

(22) Filed: Nov. 18, 2024

(30) Foreign Application Priority Data

Nov. 6, 2024 (CN) .......................... 202422711825.6

(51) Int. Cl.
*H04M 1/00* (2006.01)
*H04M 1/04* (2006.01)
(52) U.S. Cl.
CPC .......... *H04M 1/04* (2013.01); *H04M 2250/52* (2013.01)
(58) Field of Classification Search
CPC ........................... H04M 1/04; H04M 2250/52
See application file for complete search history.

(56) References Cited

U.S. PATENT DOCUMENTS

| 11,285,886 | B2* | 3/2022 | Su | H04M 1/04 |
| 2018/0245880 | A1* | 8/2018 | Campbell | F41J 5/10 |
| 2022/0006890 | A1* | 1/2022 | Zhou | H04B 1/385 |
| 2023/0086752 | A1* | 3/2023 | Adelman | F16B 2/185 |
| | | | | 248/316.1 |

* cited by examiner

*Primary Examiner* — Pakee Fang

(57) ABSTRACT

A telescope cell phone holder, comprising a fixing ring and a suction cup, a connection plate is provided on one side of the fixing ring, an adjustment groove is provided on the connection plate, and a second knob bolt is installed in the adjustment groove to connect with the suction cup; a rotating ring is rotatably mounted on an inner side of the fixing ring, and a plurality of clamping jaws are rotatably mounted on one side of the rotating ring via fasteners, and fixing pins are fixedly provided on one side of a plurality of clamping jaws, and a plurality of U-shaped grooves that can be connected with fixing pins are provided on a side of the fixing ring; a driving mechanism is installed on one side of the fixing ring for driving the rotating ring for rotating adjustment.

10 Claims, 6 Drawing Sheets

TELESCOPE CELL PHONE HOLDER

TECHNICAL FIELD

The invention belongs to the technical field of cell phone accessories, specifically relates to a telescope cell phone holder.

BACKGROUND ART

With the continuous improvement of cell phone camera function, cell phone photo quality is also getting better and better; now many friends going out to play also like to use the phone to take pictures, the shooting effect of which is not worse than the camera, however, when the cell phone lens are used to take pictures, the focal length is basically changed through the optical zoom, and the cell phone itself can not use the physical zoom, so the focal length is short, resulting in cell phone can only shoot the scene at short range, and the distant scenery can be displayed in a fuzzy manner, and the photographing operation is very troublesome if the telescope is held by a hand and then the mobile phone is used for photographing, so that the telescope capable of being clamped on the camera of the mobile phone is provided on the market to solve the above problems.

Existing Chinese patent application No. 202322211056.9, disclosed a clamping cell phone telescope, which can freely adjust the telescope position through the adjusting rod and the outstretched rod and can move the adjusting rod back and forth through the position of adjusting rod on the threaded rod, so that the cell phone telescope can be moved back and forth, and make the connection with the cell phone camera closer, which can further be adapted to a variety of different cell phones; since its fixing sleeve connected with the telescope is of a fixed style, in actual use, it's difficult to adapt and connect with more than one type of monocular telescopes, and there is a certain limitation in the use. Therefore, in view of this, the invention provides a telescope cell phone holder to improve the shortcomings in prior art, so as to achieve a purpose of providing more practical value.

SUMMARY OF THE INVENTION

In order to solve the above technical problem, the invention provides a telescope cell phone holder, which is achieved via the following technical means:

a telescope cell phone holder, comprising a fixing ring and a suction cup, a connection plate is provided on one side of the fixing ring, an adjustment groove is provided on the connection plate, and a second knob bolt is installed in the adjustment groove to connect with the suction cup; a rotating ring is rotatably mounted on an inner side of the fixing ring, and a plurality of clamping jaws are rotatably mounted on one side of the rotating ring via fasteners, and fixing pins are fixedly provided on one side of a plurality of clamping jaws, and a plurality of U-shaped grooves that can be connected with fixing pins are provided on a side of the fixing ring; a driving mechanism is installed on one side of the fixing ring for driving the rotating ring for rotating adjustment.

Further, the number of clamping jaws is at least three.

Further, shafts are fixedly mounted at ends of the clamping jaws, and clamping wheels are fixedly mounted at both ends of the shafts, and the clamping wheels are made of rubber.

Further, an inner side of each clamping jaw is a cambered surface, and diameter of the cambered surface is equal to inner diameter of the rotating ring; an inner side of the rotating ring is provided with a plurality of storage grooves for storing the clamping wheels.

Further, an other side of the fixing ring is provided with a mounting boss, a mounting groove is provided on an interior of the mounting boss, and the fixing ring is provided with a sealing plate mounted near an opening of the mounting groove; the driving mechanism includes an elastic rod mounted in the mounting groove, and a top of the mounting boss is provided with a threaded hole communicated with the mounting groove, and a first knob bolt is installed via the threaded hole.

Further, a driving plate is fixedly mounted on one side of the rotating ring, and the driving plate is mounted inside the mounting groove and is located between the elastic rod and the first knob bolt; the elastic rod and the first knob bolt are both set in a hemispherical shape at an end close to each other.

Further, the elastic rod includes a cylinder fixedly connected to the mounting groove, a top of the cylinder is connected to a telescopic rod, and a spring is connected between the telescopic rod and the cylinder.

Further, a back cover plate is fixedly mounted on a back side of the fixing ring, and a circular hole is provided in a center of the back cover plate.

Further, a T-shaped groove is provided on one side of the connection plate, and a T-shaped bar capable of slidably connected with the T-shaped groove is provided on one side of the suction cup, and a threaded hole capable of connecting with the second knob bolt is provided on one side of the T-shaped bar.

Further, an annular groove is provided on a back side of the suction cup, and a magnetic ring is installed inside the annular groove, and the suction cup is fixedly installed with a silicone ring near an opening of the annular groove.

Compared with prior art, the invention has the following advantageous effects:

The invention can realize rapid clamping of different types of monoculars through a plurality of clamping jaws on the rotating ring, which has high applicability and can effectively meet the user's needs; at the same time, the setting of the fixing ring and the driving mechanism can realize rapid and synchronous adjustment of a plurality of clamping jaws, which has high operation convenience and facilitates rapid clamping when in use.

BRIEF DESCRIPTION OF ACCOMPANY DRAWINGS

1 fixing ring, 101 connection plate, 102 T-shaped groove, 103 mounting boss, 104 U-shaped groove, 2 rotating ring, 3 back cover plate, 4 suction cup, 401 T-shaped bar, 402 magnetic ring, 403 silicone ring, 5 first knob bolt, 6 driving plate, 7 elastic rod, 8 clamping jaw, 9 clamping wheel, 10 second knob bolt, 11 sealing plate.

SPECIFIC EMBODIMENT OF THE INVENTION

The following embodiments of the invention are described in further detail in connection with the accompanying drawings and embodiments. The following embodiments are used to illustrate the invention, but cannot be used to limit the scope of the invention.

Embodiment

Figure 1:
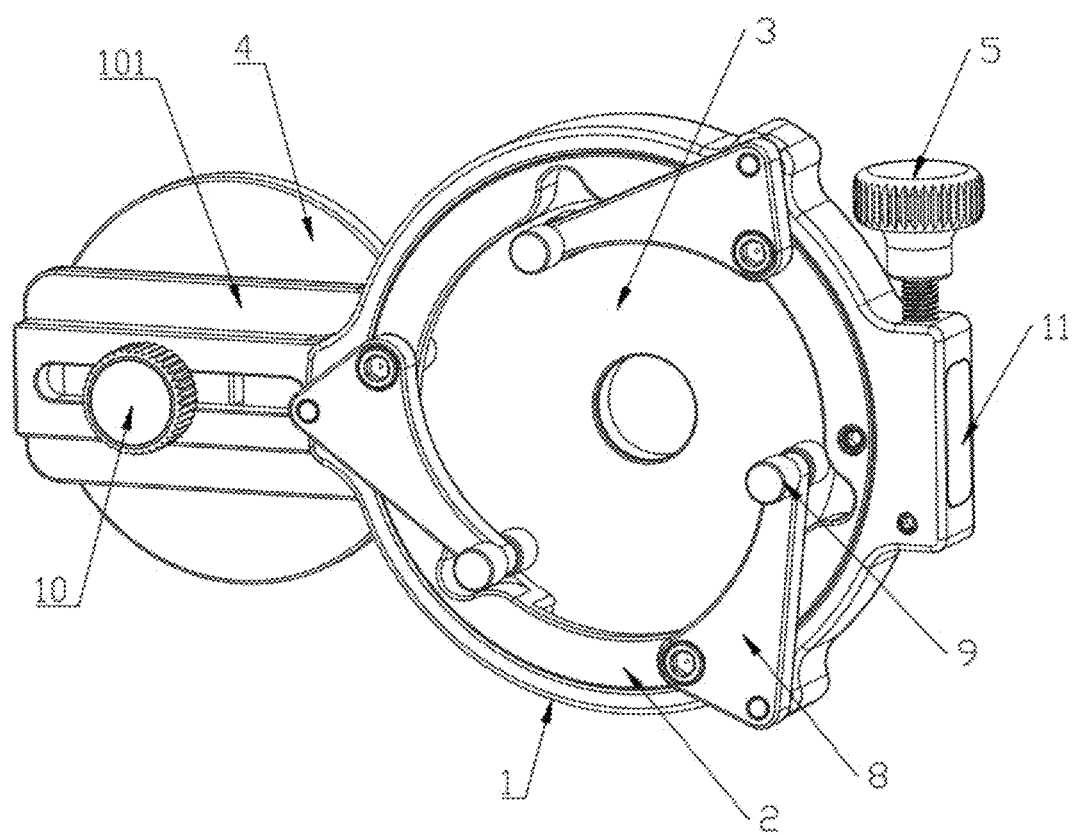
FIG. 1 shows an overall structural diagram of the invention.
Figure 2:
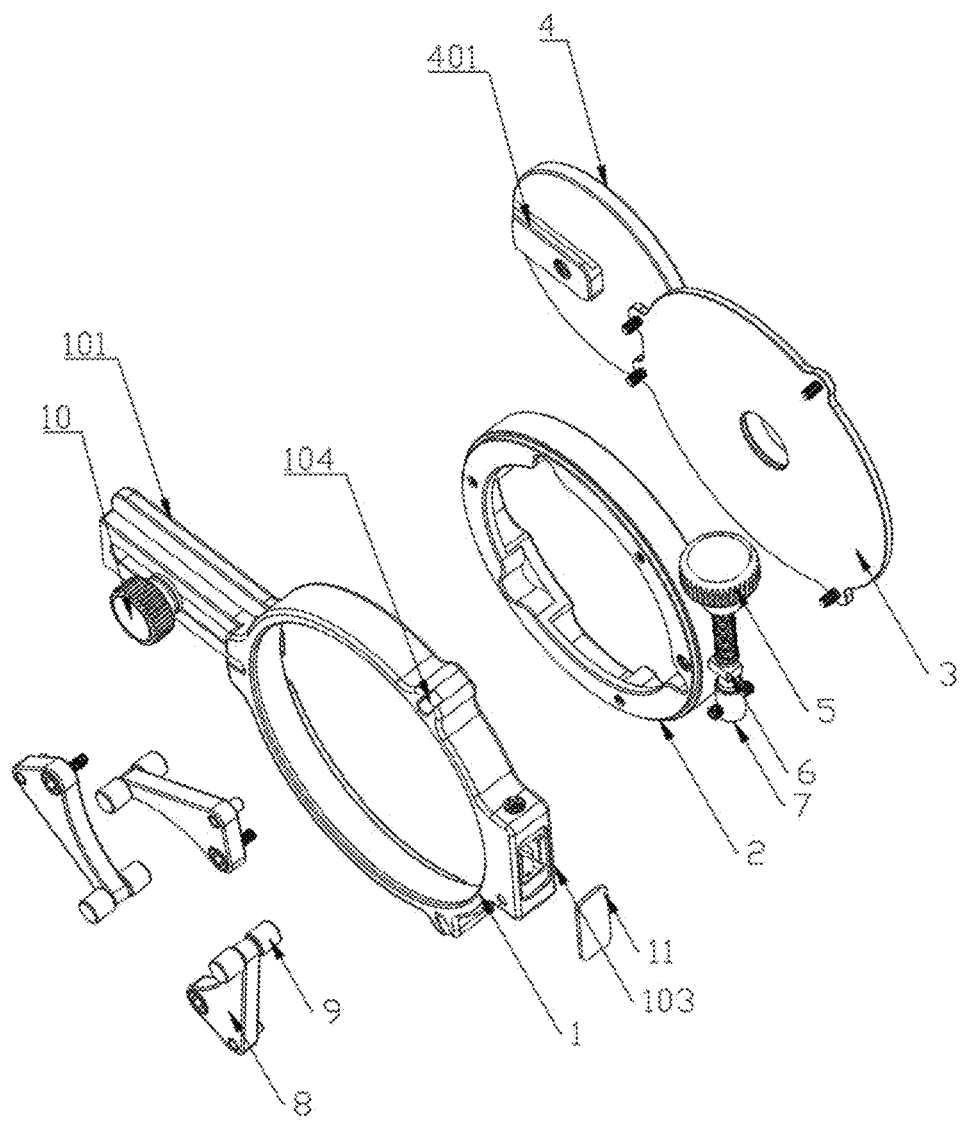
FIG. 2 shows a first disassembly diagram of the invention.
Figure 3:
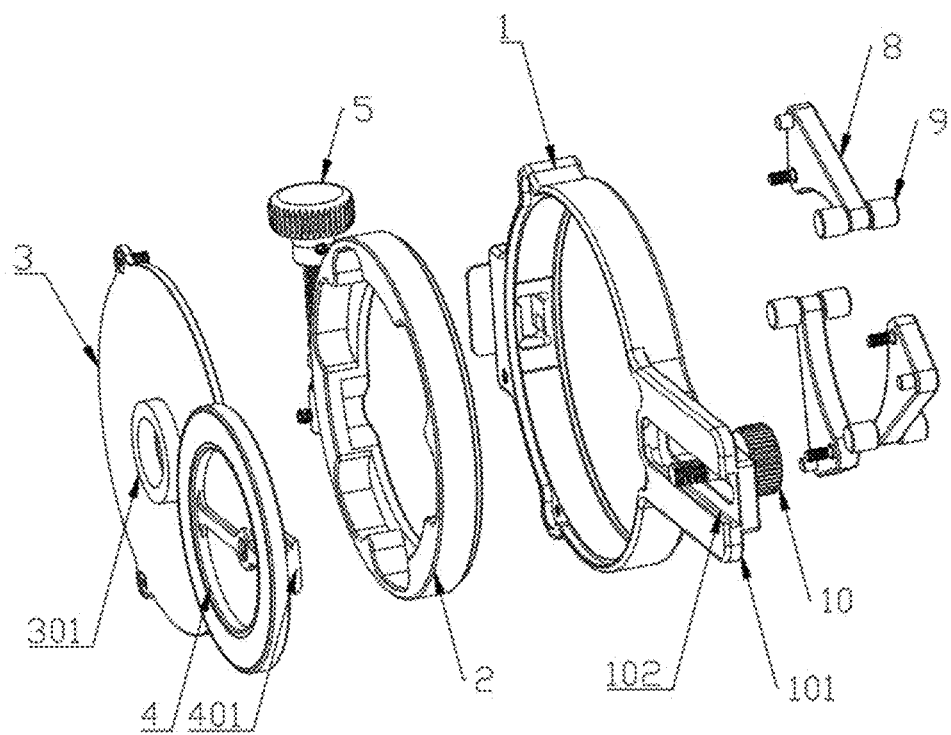
FIG. 3 shows a second disassembly diagram of the invention.
Figure 4:
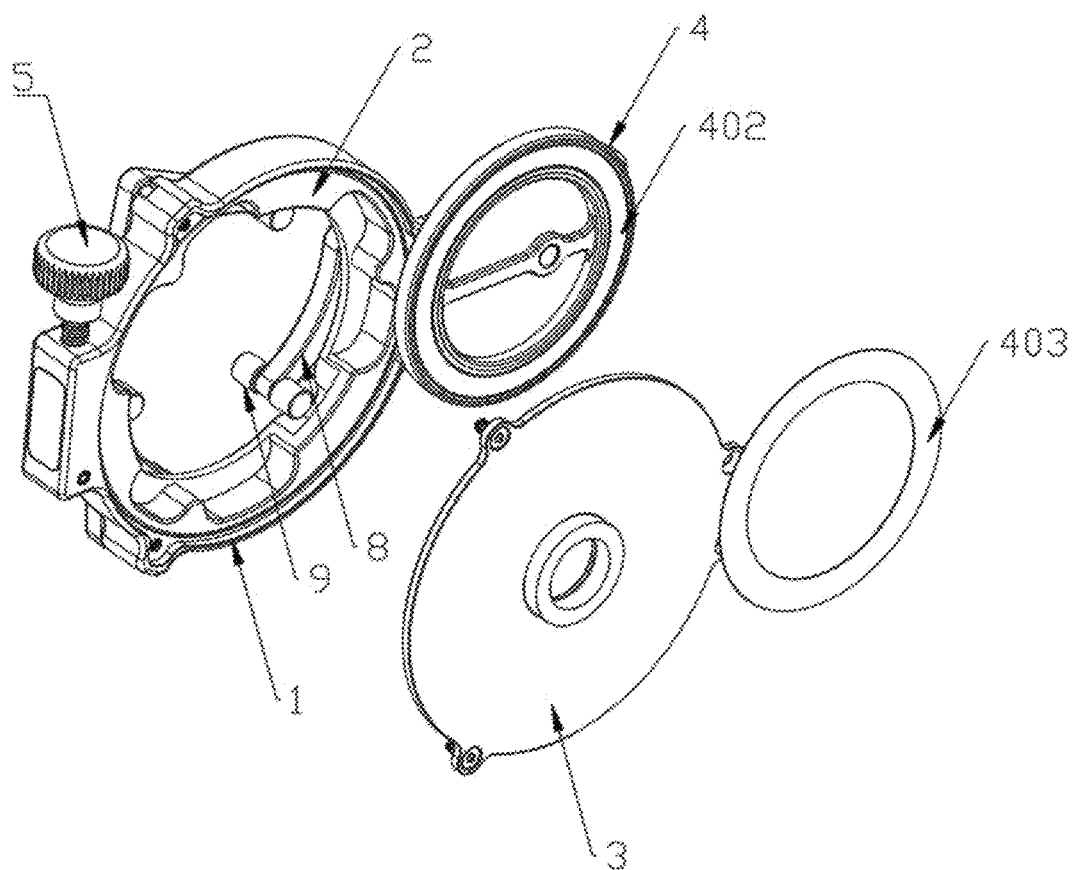
FIG. 4 shows a third disassembly diagram of the invention.
Figure 5:
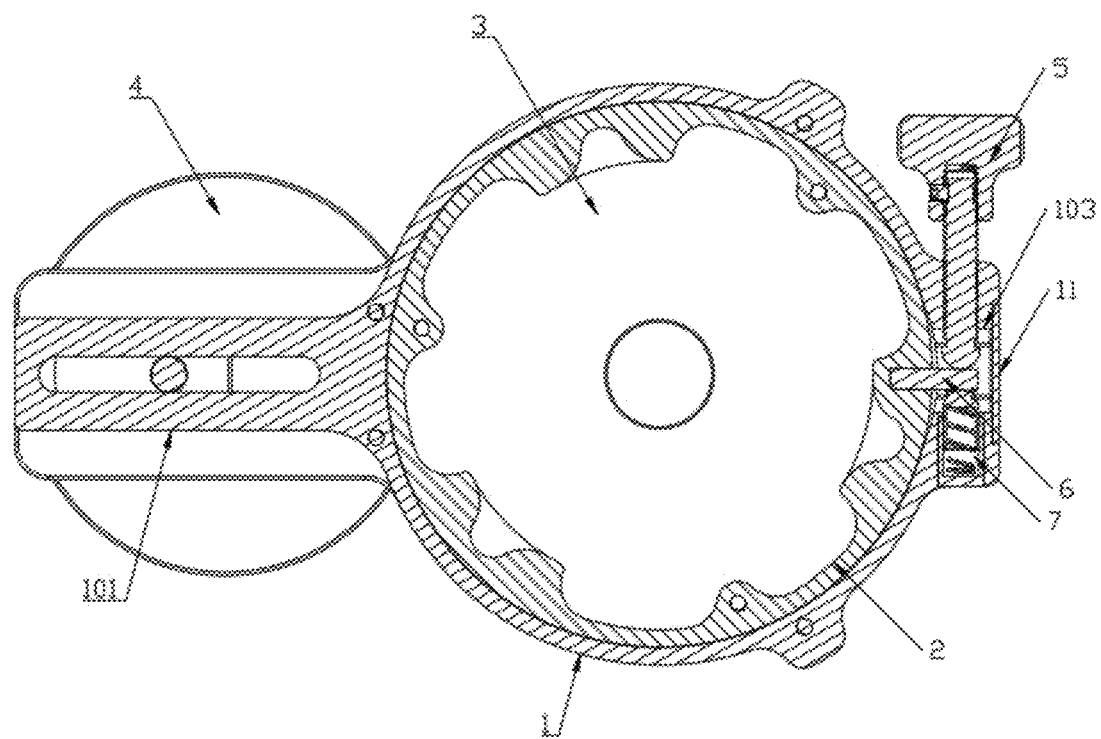
FIG. 5 shows a sectional view of the invention.
Figure 6:
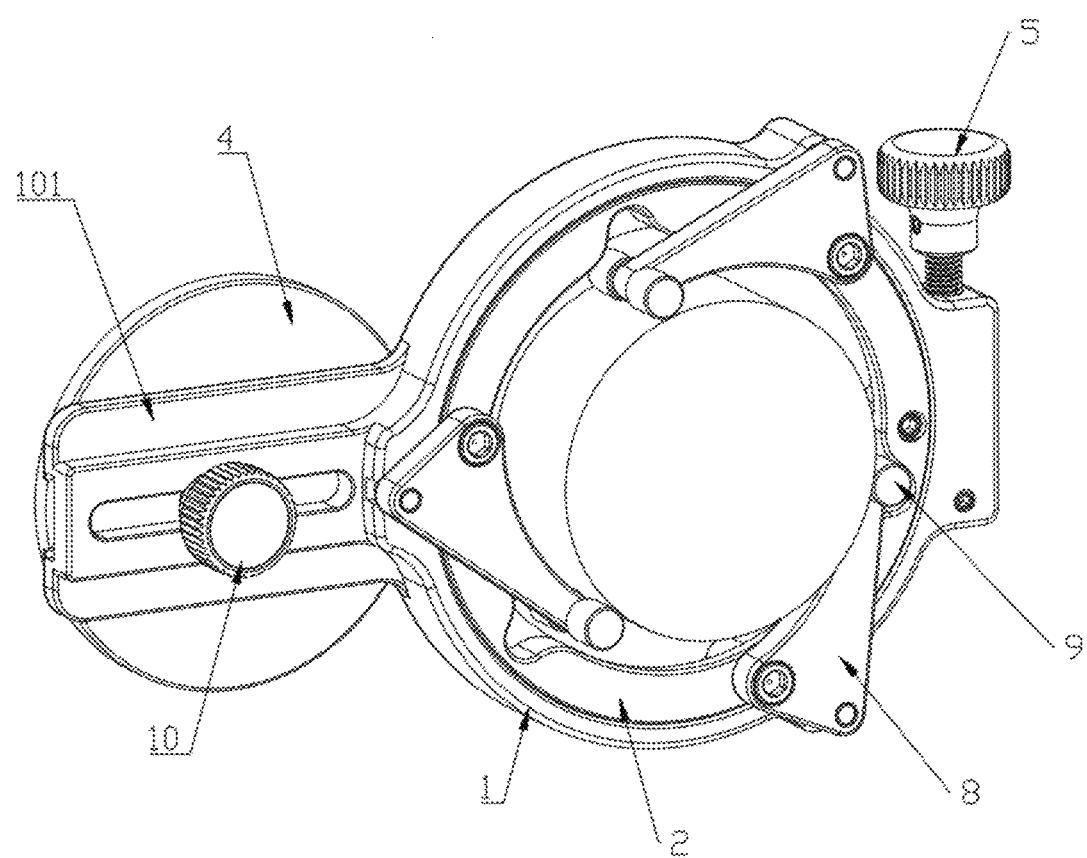
FIG. 6 shows a structural diagram of after the invention is mounted with a telescope.

As shown from FIG. 1 to FIG. 6, the invention provides a telescope cell phone holder, including a fixing ring 1 and a suction cup 4, a connection plate 101 is provided on one side of the fixing ring 1, the suction cup 4 is slidably connected with the connection plate 101; an adjustment groove is provided on the connection plate 101, and a second knob bolt 10 is installed in the adjustment groove to connect with the suction cup 4; a rotating ring 2 is rotatably mounted on an inner side of the fixing ring 1, and a plurality of clamping jaws 8 are rotatably mounted on one side of the rotating ring 2 via fasteners, and fixing pins are fixedly provided on one side of a plurality of clamping jaws 8, and a plurality of U-shaped grooves 104 that can be connected with fixing pins are provided on a side of the fixing ring 1; a driving mechanism is installed on one side of the fixing ring 1 for driving the rotating ring 2 for rotating adjustment.

Wherein, the number of clamping jaws 8 is at least three, to realize fast and stable clamping of the telescope.

Shafts are fixedly mounted at ends of the clamping jaws 8, and clamping wheels 9 are fixedly mounted at both ends of the shafts, and the clamping wheels 9 are made of rubber to ensure that telescope surface is not damaged easily when the clamping jaws 8 clamp the telescope.

Wherein, an inner side of each clamping jaw 8 is a cambered surface, and diameter of the cambered surface is equal to inner diameter of the rotating ring 2; an inner side of the rotating ring 2 is provided with a plurality of storage grooves for storing the clamping wheels 9, so as to reduce occupation of the internal space of the rotating ring 2 by the clamping wheels 9 when the clamping jaws 8 are stowed in the limit position, and provide a larger mounting space for mounting use.

Wherein, an other side of the fixing ring 1 is provided with a mounting boss 103, a mounting groove is provided on an interior of the mounting boss 103, and the fixing ring 1 is provided with a sealing plate 11 mounted near an opening of the mounting groove; the driving mechanism includes an elastic rod 7 mounted in the mounting groove, and a top of the mounting boss 103 is provided with a threaded hole communicated with the mounting groove, and a first knob bolt 5 is installed via the threaded hole.

Wherein, a driving plate 6 is fixedly mounted on one side of the rotating ring 2, and the driving plate 6 is mounted inside the mounting groove and is located between the elastic rod 7 and the first knob bolt 5; the elastic rod 7 and the first knob bolt 5 are both set in a hemispherical shape at an end close to each other to facilitate sliding of the driving plate 6 with the elastic rod 7 and the first knob bolt 5 when the first knob bolt 5 is turned to extrude the driving plate 6 for driving the rotation ring 2 to rotate.

Wherein, the elastic rod 7 includes a cylinder fixedly connected to the mounting groove, a top of the cylinder is connected to a telescopic rod, and a spring is connected between the telescopic rod and the cylinder, so that when the first knob bolt 5 is loosened, the driving plate 6 can be driven to rotate by the action of the telescopic rod on the spring, so as to ensure that the driving plate 6 can always be in contact with the elastic rod 7 and the first knob bolt 5.

Wherein, a back cover plate 3 is fixedly mounted on a back side of the fixing ring 1, and a circular hole is provided in a center of the back cover plate 3, so that it is easy to align the phone's camera and have the camera exposed for image capture.

Wherein, a T-shaped groove 102 is provided on one side of the connection plate 101, and a T-shaped bar 401 capable of slidably connected with the T-shaped groove 102 is provided on one side of the suction cup 4 to improve the connection stability of the connection plate 101 and the suction cup 4, and a threaded hole capable of connecting with the second knob bolt 10 is provided on one side of the T-shaped bar 401.

Wherein, an annular groove is provided on a back side of the suction cup 4, and a magnetic ring 402 is installed inside the annular groove for quick attraction to a back of the phone with high ease of use, and the suction cup 4 is fixedly installed with a silicone ring 403 near an opening of the annular groove to ensure that the back of the phone will not be damaged in attraction.

The working principle of the embodiment: when in use, firstly, the holder is mounted on the back of the cell phone via the suction cup 4, after which the position of the fixing ring 1 is adjusted so that the circular hole of the back cover plate 3 is aligned with the camera of the cell phone, after which the second knob bolt 10 is turned to lock the fixing ring 1, and finally the monocular can be mounted and the clamping jaws 8 are adjusted by using the first knob bolt 5 to fix the monocular. The invention can realize rapid clamping of different types of monoculars through a plurality of clamping jaws 8 on the rotating ring 2, which has high applicability and can effectively meet the user's needs; at the same time, the setting of the fixing ring 1 and the driving mechanism can realize rapid and synchronous adjustment of a plurality of clamping jaws 8, which has high operation convenience and facilitates rapid clamping when in use.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

The invention claimed is:

1. A telescope cell phone holder, comprising a fixing ring and a suction cup, a connection plate is provided on one side of the fixing ring, an adjustment groove is provided on the connection plate, and a second knob bolt is installed in the adjustment groove to connect with the suction cup; a rotating ring is rotatably mounted on an inner side of the fixing ring, and a plurality of clamping jaws are rotatably mounted on one side of the rotating ring via fasteners, and fixing pins are fixedly provided on one side of a plurality of clamping jaws, and a plurality of U-shaped grooves that can be connected with fixing pins are provided on a side of the fixing ring; a driving mechanism is installed on one side of the fixing ring for driving the rotating ring for rotating adjustment.

2. The telescope cell phone holder of claim 1, wherein the number of clamping jaws is at least three.

3. The telescope cell phone holder of claim 1, wherein shafts are fixedly mounted at ends of the clamping jaws, and clamping wheels are fixedly mounted at both ends of the shafts, and the clamping wheels are made of rubber.

4. The telescope cell phone holder of claim 3, wherein an inner side of each clamping jaw is a cambered surface, and diameter of the cambered surface is equal to inner diameter of the rotating ring; an inner side of the rotating ring is provided with a plurality of storage grooves for storing the clamping wheels.

5. The telescope cell phone holder of claim 1, wherein an other side of the fixing ring is provided with a mounting boss, a mounting groove is provided on an interior of the mounting boss, and the fixing ring is provided with a sealing plate mounted near an opening of the mounting groove; the driving mechanism includes an elastic rod mounted in the mounting groove, and a top of the mounting boss is provided with a threaded hole communicated with the mounting groove, and a first knob bolt is installed via the threaded hole.

6. The telescope cell phone holder of claim 5, wherein a driving plate is fixedly mounted on one side of the rotating ring, and the driving plate is mounted inside the mounting groove and is located between the elastic rod and the first knob bolt; the elastic rod and the first knob bolt are both set in a hemispherical shape at an end close to each other.

7. The telescope cell phone holder of claim 5, wherein the elastic rod includes a cylinder fixedly connected to the mounting groove, a top of the cylinder is connected to a telescopic rod, and a spring is connected between the telescopic rod and the cylinder.

8. The telescope cell phone holder of claim 1, wherein a back cover plate is fixedly mounted on a back side of the fixing ring, and a circular hole is provided in a center of the back cover plate.

9. The telescope cell phone holder of claim 1, wherein a T-shaped groove is provided on one side of the connection plate, and a T-shaped bar capable of slidably connected with the T-shaped groove is provided on one side of the suction cup, and a threaded hole capable of connecting with the second knob bolt is provided on one side of the T-shaped bar.

10. The telescope cell phone holder of claim 1, wherein an annular groove is provided on a back side of the suction cup, and a magnetic ring is installed inside the annular groove, and the suction cup is fixedly installed with a silicone ring near an opening of the annular groove.

\* \* \* \* \*